April 29, 1952
P. F. KOCH
2,594,450
PULLEY AND CLUTCH MECHANISM
Filed Jan. 3, 1951
2 SHEETS—SHEET 2
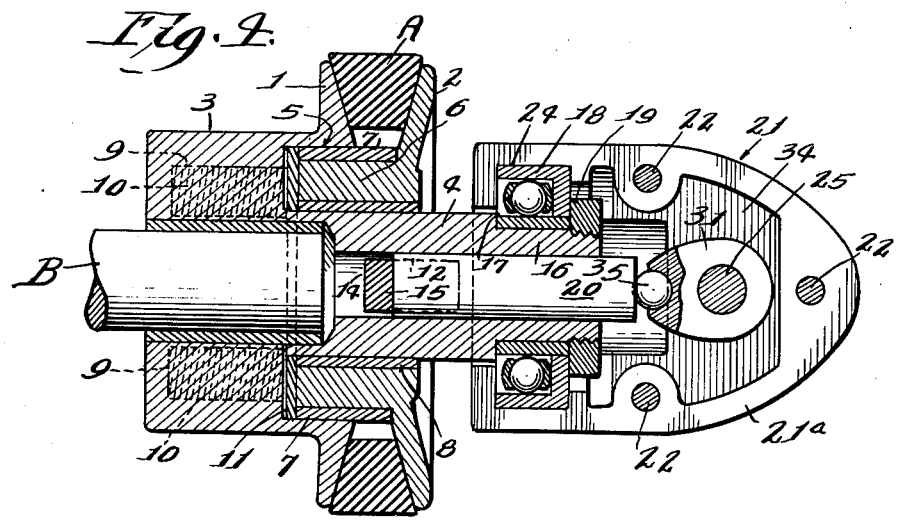
Inventor,
Paul F. Koch
By Wm F Freudenreich,
Attorney.

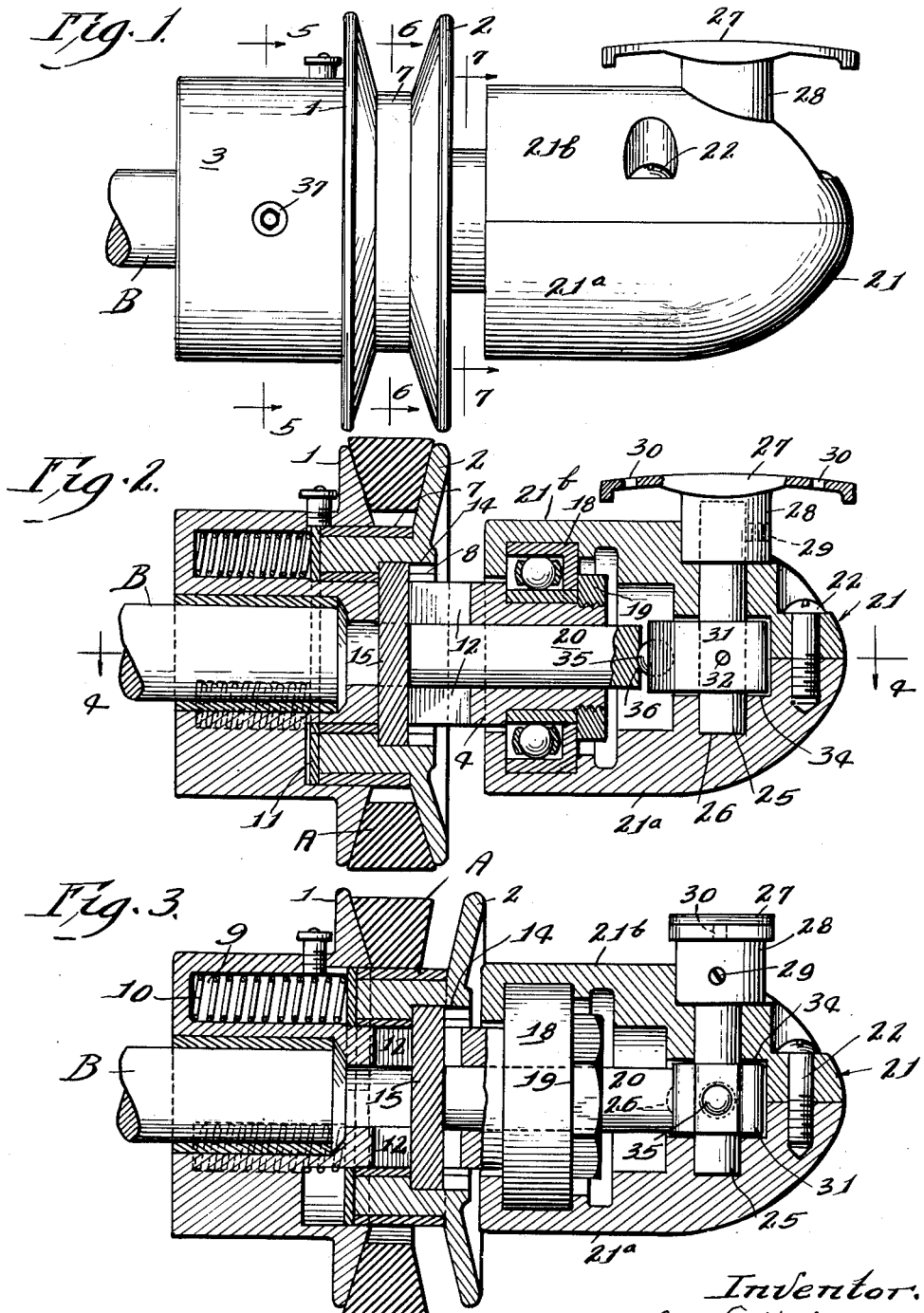

Patented Apr. 29, 1952

2,594,450

UNITED STATES PATENT OFFICE 2,594,450

PULLEY AND CLUTCH MECHANISM

Paul F. Koch, Chicago, Ill., assignor to Chicago Die Casting Manufacturing Company, a corporation of Illinois Application January 3, 1951, Serial No. 204,113

9 Claims. (Cl. 74—230.24)

The present invention relates to pulley devices provided with means to establish or interrupt a driving relation between the same and cooperating belts; as for example, in the case of a mowing machine, wherein a V belt runs over pullies on a driving shaft and a driven shaft that operates the cutting mechanism, and it is desirable to be able to stop the cutting mechanism while the driving shaft continues to rotate.

The present invention has for its object to produce a simple, novel and efficient combination pulley and clutch mechanism that needs only to be attached to one end of a shaft to be ready for use for driving or stopping a cooperating belt, at will. It is a further object to produce a clutch mechanism that shall be durable, sturdy and easy to assemble and take apart.

In carrying out my invention, I divide a pulley, transversely of its axis, into two sections each of which is provided with one of the two usual flanges on pulleys for V belts. One section has on one side a hub to be fitted over the end of a shaft and, on the other side, a long tubular post projecting axially therefrom. The second section is slidable on the post from and toward the first section. Springs tend to spread the pulley sections apart, whereas cam-operated pusher means, mounted on the post, serve to press them together into driving relation with a cooperating belt. The sliding pulley section and the supporting post are interlocked by means of a simple key or bar that may be inserted or removed quickly and easily, but which cannot accidentally be displaced.

The various features of novelty whereby the present invention is characterized will hereinafter be pointed out with particularity in the claims, but, for a full understanding of the invention and of its objects and advantages reference may be had to the following detailed description taken in connection with the accompanying drawings, wherein:

Figure 1 is a side elevational view of a mechanism embodying the present invention; Fig. 2 is a longitudinal, central section; Fig. 3 is a section similar to Fig. 2 with the parts in the belt-releasing positions; Fig. 4 is a section on line 4—4 of Fig. 2; Fig. 5 is a section on line 5—5 of Fig. 1; Fig. 6 is a section on line 6—6 of Fig. 1, and Fig. 7 is a section on line 7—7 of Fig. 1.

Referring to the drawings, 1 and 2 are pulley flanges, of conventional or other type, for cooperation with a V belt A positioned in the valley between the flanges. Flange 1 is integral with a heavy cylindrical body member or hub 3 which projects from one side thereof. Integral with the hub and projecting far beyond the opposite side of the flange 1 is a long, tubular post 4. Part 3 is cut away on the inner side to create a wide, deep annular groove 5 around the base of the post. Flange 2 surrounds one end of a heavy sleeve or hub 6, integral therewith. Surrounding sleeve 6 is a thinner sleeve 7, whereas another thin sleeve 8 serves as a lining for sleeve 6. Sleeve 6, with its sleeves 7 and 8, is a sliding fit in the annular groove 5; sleeves 7 and 8 being preferably made of bronze or the like when the main pulley parts are die castings.

Part 3 contains deep wells 9 parallel with the axis of the pulley and communicating at their open ends with annular groove 5. In these wells are compression springs 10. If desired, there may be in the bottom of that groove a washer 11 that engages the springs and transmits pressure therefrom to the end of sleeve 6. With the springs under initial compression, they tend constantly to spread apart the two pulley sections or members.

The sliding member of the pulley is interlocked with the post to prevent accidental separation. To this end post 4 contains two long, wide, diametrically opposed longitudinal slots 12, 12 lying partly within and partly outside of annular groove 5. Sleeve 6 contains two opposed internal grooves 14, 14 that register with slots 12, 12; these grooves being open on their outer ends, namely on the side face of the pulley on which flange 2 is located, and being closed at their inner ends because they are only about one half as long as sleeve 6. Extending transversely of the post through slots 12, 12 and into grooves 14, 14, is a key in the form of a rectangular bar 15, set on edge and having a thickness equal to only about one half of the length of the grooves.

The outer end of post 4 comprises a section 16 of reduced diameter, providing at the base end of the latter a shoulder 17 spaced apart from the bottom of the annular groove 5 a distance more than one half again as great as the length of the sleeve 6. Surrounding this part of the post is a conventional ball bearing assembly 18. A nut 19, screwed onto the extreme end of the post, cooperates with shoulder 17 to hold this assembly in place.

Slidable in the post and protruding from the free end of the latter is a cylindrical plunger or strut 20 which bears at one end against bar 15. Embracing the ball bearing assembly 18, and extending well beyond the free end of post 4, is a casing or housing 21. The casing is conveniently acorn-shaped, with the tip at the outer end. The casing is divided longitudinally into two halves, 21ª and 21ᵇ, normally held together by three machine screws 22. Within the inner or base end of the casing is an annular groove 24 into which the peripheral portion of the ball bearing assembly fits, so as to be gripped and tightly held when the two halves of the casing are fastened together. The casing is therefore freely rotatable relatively to the post.

Mounted within casing 21, at the axis of the mechanism and at right angles to the plane of division in the casing, is a short shaft 25, one end of which rests in a socket 26 in casing member 21ª, while the other end extends out through member 21ᵇ and is provided with a suitable head by which it may be turned. In the arrangement shown, this head is T-shaped, comprising a cross piece 27 and a short sleeve-like stem 28 that fits over the end of the shaft and is secured thereto by a set screw 29. Part 27 has holes 30, 30 near the ends thereof. Wires (not shown), for example, may be engaged in these holes and serve both as means for turning the shaft and holding the casing against rotation when the pulley is running. Shaft 25 extends through a cam 31 that lies just beyond the end of plunger 20 and is fixed to the shaft by a set screw 32. The cam is in the form of a thick block that is an easy fit between upper and lower surfaces of a pocket 34 in the assembled casing; whereby the shaft is held against endwise movement, while free to turn in the casing.

The cam is preferably provided with a steel ball 35 set into the same and protruding a little therefrom at the high point of the cam. The adjacent end face of the plunger 20 is provided with a central depression 36 in which the ball seats itself when the cam is turned far enough to bring the ball into registration with the depression. The ball 35 and the depression 36 provide a yieldable lock for the cam when the ball is seated in the depression.

In the use of the device, part 3 is slipped onto the end of a shaft B and is secured thereto by a set screw 37. With the cam in the position occupied in Figs. 1 and 4, the valley or channel between the pulley flanges has been narrowed sufficiently to provide adequate traction between the flanges and the belt. When it is desired to stop the belt, while shaft B continues to revolve, the cam actuator is turned through an angle of ninety degrees. Springs 10 are under maximum compression in Fig. 2, solely by the cam, acting through the plunger and bar 15. Therefore, as the cam begins to turn, its pressure on the plungers is released and springs 10 are permitted to expand and push the slidable pulley section toward the right as viewed in Figs. 2 and 3. When the cam has completed its release movement the conditions are those illustrated in Fig. 3, the valley between the pulley flanges having become so wide that the belt becomes slack and is left without traction.

Whatever slight tendency there may be for the cam-containing casing to rotate with the pulley, this is easily checked by cam-operating wires (not shown), leading away from the device in a direction to be placed under tension by any force that may be exerted thereon by the casing.

It will be seen that my new mechanism is of sturdy construction and will last indefinitely; the two bronze bearing sleeves 7 and 8 permitting the main parts to be in the form of die castings, without detracting from the durability of the device. Sleeve 7 is preferably loose on part 6.

One of the important characteristics of the invention is the simplicity of assembly and disassembly coupled with assurance against accidental disturbance of proper working conditions. This is due in large part through the unique connection between the post and the sliding pulley section. In order to remove the cross bar 15, the sliding pulley section must be far toward the left, as viewed in Fig. 3, so as to uncover the right hand halves of slots 12 in the post. Even then, unless the device is placed in a vertical position, so that the bar can drop, it is not easy to get the bar into a position to slide out lengthwise.

In order initially to assemble the parts, springs 10 are set into wells 9 and washer 11 and the sliding pulley section are slipped over the post. The sliding pulley section is then pushed inwardly along the post until the bar 15 can be inserted freely through slots 12. Then, with grooves 14 registering with these slots, the ends of the bar enter and bottom in the grooves as soon as the sliding pulley section is released and is pushed outwardly by the springs until the bar reaches the outer ends of the slots and comes to rest. The ball bearing assembly is then slipped on and nut 19 is applied. After the plunger has been inserted the cam and shaft assembly are applied to section 21ᵇ of the casing. The two halves of the casing are then brought together to embrace the roller bearing assembly, with the inner end of cam shaft 25 entering socket 26 in casing section 21ª. The screws 22 are then inserted to secure the two halves of the casing together and place the device in condition for use.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. A pulley and clutch mechanism comprising a pulley divided into two members transversely of the pulley axis, each member having thereon a flange cooperating with the flange on the other member to create an annular belt-receiving valley, one of said members being provided with an axial post extending through and being a sliding fit in the second of said members, a casing mounted on the outer end of said post for rotation thereon while held against movement lengthwise thereof, pusher means, including a part exposed within the casing, to force said second pulley member toward the cooperating pulley member, a cam in said casing engaged with said part to actuate the pusher means, and an operating element for the cam on the exterior of the casing.

2. A pulley and clutch mechanism comprising a pulley divided into two members transversely of the pulley axis, each member having thereon a flange cooperating with the flange on the other member to create an annular belt-receiving valley, one of said members being provided with an axial, tubular post extending through and being a sliding fit in the second of said members, a casing mounted on the outer end of said post for rotation thereon while held against movement lengthwise thereof, pusher means, including a plunger slidable in said post and exposed at one end within the casing, to force said second pulley member toward the cooperating pulley member, a cam in said casing engaged with the outer end of the plunger to actuate the pusher means, and an operating element for the cam on the exterior of the casing.

3. A pulley and clutch mechanism as set forth in claim 2, wherein the outer end of the plunger contains a depression and the cam has a ball set into the same at its high point to enter said depression when the plunger is in its farthest inward position.

4. A pulley and clutch mechanism comprising a pulley divided into two members transversely of the pulley axis, each member having thereon a flange cooperating with the flange on the other member to create an annular belt-receiving valley, one of said members being provided with an axial, tubular post extending through and being a sliding fit in the second of said members, said post containing diametrically opposed, longitudinal slots, a loose cross bar extending through said slots and interlocked at its ends with said second member, a casing mounted on the outer end of the post for rotation thereon while being held against movement along the post, a plunger slidable in the post and engaged at one end with said cross bar, a cam in said casing engaged with the other end of said plunger and shaped to move the plunger inwardly upon turning the cam into a predetermined position, and an element extending from the cam to the exterior of the casing for turning the cam.

5. A pulley and clutch mechanism comprising a pulley divided into two members transversely of the pulley axis, each member having thereon a flange cooperating with the flange on the other member to create an annular belt-receiving valley, one of said members being provided with an axial, tubular post extending through and being a sliding fit in the second of said members, said post containing diametrically opposed, longitudinal slots, said second member containing internal grooves registering with said slots, said grooves being open at their outer ends and closed at their inner ends, a loose cross bar extending through said slots and entered at its ends in said grooves in the second member, a casing mounted on the outer end of the post for rotation thereon while being held against movement along the post, a plunger slidable in the post and engaged at one end with said cross bar, a cam in said casing engaged with the other end of said plunger and shaped to move the plunger inwardly upon turning the cam into a predetermined position, and an element extending from the cam to the exterior of the casing for turning the cam.

6. A pulley and clutch mechanism comprising a pulley divided into two members transversely of the pulley axis, each member having thereon a flange cooperating with the flange on the other member to create an annular belt-receiving valley, one of said members being provided with an axial, tubular post extending through and being a sliding fit in the second of said members, said post containing diametrically opposed, longitudinal slots, a cross bar extending through said slots and interlocked at its ends with said second member, a section at the outer end of the post being reduced in diameter to provide an annular shoulder at the inner end of that section, a ball bearing assembly rotatable on said section, a nut on the post cooperating with said shoulder to hold the bearing assembly in place, a divided casing in one end of which said ball bearing assembly is gripped and housed, a plunger slidable in the post and engaged at one end with said cross bar, a cam in said casing engaged with the other end of said plunger and shaped to move the plunger inwardly upon turning the cam into a predetermined position, and an element extending from the cam to the exterior of the casing for turning the cam.

7. A pulley and clutch mechanism as set forth in claim 1 having, in addition, spring means tending constantly to spread the two pulley members apart.

8. A pulley and clutch mechanism as set forth in claim 2 having, in addition, spring means between the two clutch members tending constantly to spread them apart.

9. A pulley and clutch mechanism as set forth in claim 6 having, in addition, spring means between the two clutch members tending constantly to spread them apart.

PAUL F. KOCH.

REFERENCES CITED

The following references are of record in the file of this patent:

UNITED STATES PATENTS

| Number | Name | Date |
|---|---|---|
| 939,427 | Main | Nov. 9, 1909 |
| 2,256,312 | Creigier | Sept. 16, 1941 |
| 2,326,468 | Koch | Aug. 10, 1943 |
| 2,459,377 | Hallinan | Jan. 18, 1949 |
| 2,495,078 | Schweickart | Jan. 17, 1950 |

FOREIGN PATENTS

| Number | Country | Date |
|---|---|---|
| 433,668 | France | Jan. 13, 1912 |